Patented Jan. 23, 1945

2,367,803

UNITED STATES PATENT OFFICE 2,367,803

METHOD OF REFINING HYDROCARBON OIL

Hans Schindler, Evanston, Ill., assignor to The Pure Oil Company, Chicago, Ill., a corporation of Ohio No Drawing. Application September 6, 1941, Serial No. 409,797

13 Claims. (Cl. 196—23)

This invention relates to a method for refining petroleum oils and more specifically to a method for removing copper from petroleum oils which have been sweetened with copper containing reagents.

It is common practice in the petroleum industry to sweeten petroleum oils, particularly gasoline and other light distillates, by contact with copper salts as, for example, cupric chloride solution alone or containing other chlorides such as sodium or ammonium chloride, as well as solutions containing copper sulfate together with sodium or ammonium chloride. The use of fuller's earth and other catalyst carriers impregnated with copper salts has also been proposed. Dispersions and solutions of copper salts such as naphthenates in non-aqueous liquids such as petroleum oil are in use particularly for desulfurizing naphthas.

In each of the various copper processes for sweetening and desulfurizing, it is common practice to regenerate the sweetening reagent by blowing or contacting with air or oxygen either during the sweetening or desulfurizing operation or after separation of the reagent from the oil or distillate which has been treated. Sweetening with copper reagents in the presence of air or oxygen results in the conversion of mercaptans to disulfides, whereas regeneration of the reagent after separation from the oil results in removal of the sulfur from the oil.

One of the disadvantages of copper sweetening methods is that small amounts of copper frequently remain in the gasoline or other distillate which is treated. These small amounts of copper apparently act as catalysts, causing rapid discoloration of the distillate and formation of gum.

The object of this invention is to remove small traces of copper which remain in oils and distillates which have been treated with copper-containing reagents and thereby stabilize them.

I have discovered that copper present in gasoline and other hydrocarbon distillates can be readily removed by contacting said distillates with certain materials having cation exchange properties. A material particularly suitable for removing the copper is hydroxy aromatic-aldehyde resin containing one or more sulfonic acid radicals. Such resins may be prepared by condensing mono- or poly-hydroxy phenols with formaldehyde in the presence of sodium sulphite; or by condensing sulfonic acids of mono- or poly-hydroxy aromatic compounds with formaldehyde. Suitable resins may also be prepared by sulfonating phenol-aldehyde resins such as "Bakelite" with strong sulfuric acid. Resins which are satisfactory for the purpose of this invention may be made in accordance with United States Patents Nos. 2,204,539 and 2,228,159. Resins of the type contemplated by this invention are marketed commercially by The Resinous Products and Chemical Company under the trade names "Amberlite IR-1" and "Amberlite IR-2".

Removal of the copper from the oil or distillate may be effected at ordinary atmospheric temperature by either intimately mixing sufficient of the cation exchange material with the distillate, which has been treated with copper-containing reagent, to react with the copper present in the distillate; or the distillate may be filtered through a bed of the cation exchange material and the material used until tests on the effluent from the bed show that copper is not completely removed from distillate which has passed through it. The sulfonated resin reacts with the copper to exchange hydrogen or alkali metal for the copper in the distillate. The resin may be regenerated either by washing with a dilute solution of acid such as sulfuric or hydrochloric or by washing with a solution of sodium chloride. The resin is effective as a cation exchange base with either hydrogen or alkali metal as the cation. The hydrogen of the acid or the sodium of the chloride replaces the copper in the cation exchange material.

In order to remove acid from distillates as a result of the treatment with the cation exchange material or which may be present from other sources, the distillate may be contacted with an anion exchange material in the same manner as it was contacted with the cation exchange material. As anion exchange materials which are suitable are resins resulting from the condensation of aromatic amines with formaldehyde or those prepared by the condensation of aliphatic polyamines with poly-halogen derivatives of the hydrocarbon. Anion exchange materials suitable for this purpose may be made in accordance with United States Patents Nos. 2,104,501 and 2,191,853 or in accordance with British Patent No. 489,173. A commercial anion exchange resin suitable for this purpose is marketed by The Resinous Products and Chemical Company under trade-mark "Amberlite IR-3" and "Amberlite IR-4." The anion exchange resin has the ability to absorb the acid molecule and entirely remove the acid from the distillate. The anion exchange resin can be regenerated by washing with sodium carbonate or sodium hydroxide solution.

The cation and anion exchange condensation products or resins hereinbefore described are solids which are insoluble in hydrocarbon oils and distillates. For use in accordance with my invention the resins may be granulated to a grain size of .25 to 1.65 millimeters.

In order to demonstrate the effectiveness of cation exchange materials in removing copper from petroleum distillates, 1% by weight of copper naphthenate was dissolved in gasoline composed of a blend of cracked and straight run gasoline. Fifteen parts by weight of the resulting solution was shaken with one part by weight of Amberlite IR-1 for fifteen minutes. The green color of the distillate completely disappeared and the color of the gasoline was approximately 9 Saybolt, whereas the color of the gasoline prior to dissolving the copper napthenate therein was 8 Saybolt. The resulting gasoline was then treated in the same proportion with Amberlite IR-4 in order to remove the naphthenic acid contained therein as a result of the treatment with the cation exchange resin. The naphthenic acid was completely removed and the color of the resulting gasoline was 9+ Saybolt.

It will be seen, therefore, that by treating petroleum oils and distillates containing small amounts of copper salts with a cation exchange material and subsequently by an anion exchange material, all traces of copper and acid can be removed and a gasoline of good color and high stability as to both color and gum deterioration can be produced.

I claim:

1. The method of removing copper from hydrocarbon oil which has been sweetened by contact with a copper compound which comprises contacting said oil with a cation exchange material comprising an oil-insoluble solid organic resinous condensation product having cation exchange properties.

2. Method in accordance with claim 1 in which the cation exchange material is a hydroxy aromatic-aldehyde condensation product containing a sulfonic radical.

3. The method of removing copper from hydrocarbon oil which has been sweetened by contact with a copper salt which comprises contacting said oil with an oil-insoluble, solid organic resinous condensation product having cation exchange properties and thereafter contacting the oil with an oil-insoluble, solid anion exchange resin having the ability to absorb acid molecules and entirely remove acid from the oil.

4. Method in accordance with claim 3 in which the cation organic resinous condensation product is a hydroxy aromatic-aldehyde condensation product containing a sulfonic radical and the anion exchange resin is an aromatic amine-aldehyde condensation product.

5. Method in accordance with claim 3 in which the anion exchange resin is the condensation product of a poly-amine and a poly-halogenated hydrocarbon.

6. The method of removing copper from gasoline distillate which has been sweetened by contact with a copper salt which comprises contacting said distillate with an oil-insoluble hydroxy aromatic-aldehyde condensation product which is insoluble in said distillate and which possesses cation exchange properties.

7. Method in accordance with claim 6 in which the cation exchange radical in the condensation product is hydrogen.

8. Method in accordance with claim 6 in which the distillate is contacted with an oil-insoluble, solid anion exchange material having the ability to absorb acid molecules from the distillate and entirely remove the acid therefrom subsequent to contact with the condensation product.

9. Method in accordance with claim 6 in which the distillate is subjected to contact with an oil-insoluble organic anion exchange resins condensation product having the ability to absorb acid molecules from the distillate and entirely remove the acid therefrom after contact with the hydroxy aromatic-aldehyde condensation product.

10. Method of removing acidic constituents from hydrocarbon oils which comprises contacting said oils with comminuted oil-insoluble organic anion exchange resinous condensation product having the ability to absorb acid molecules and entirely remove acids from the oil.

11. Method in accordance with claim 10 in which the resinous condensation product is an aromatic amine-aldehyde condensation product.

12. Method in accordance with claim 10 in which the resinous condensation product is the condensation product of a poly-amine and a poly-halogenated hydrocarbon.

13. Method of removing from hydrocarbon oils acidic constituents resulting from the treatment of the oil with a cation exchange material which comprises contacting the oil with an oil insoluble, solid, organic anion exchange resinous condensation product having the ability to absorb said acidic constituents and entirely remove them from the oil.

HANS SCHINDLER.